United States Patent
Masuko

(10) Patent No.: US 9,886,192 B2
(45) Date of Patent: *Feb. 6, 2018

(54) TERMINAL DEVICE, CONTROL METHOD FOR TERMINAL DEVICE, PROGRAM, AND INFORMATION STORAGE MEDIUM

(71) Applicant: Rakuten, Inc., Tokyo (JP)

(72) Inventor: Soh Masuko, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 87 days.

This patent is subject to a terminal disclaimer.

(21) Appl. No.: 14/781,034

(22) PCT Filed: Mar. 29, 2013

(86) PCT No.: PCT/JP2013/059770
§ 371 (c)(1),
(2) Date: Sep. 29, 2015

(87) PCT Pub. No.: WO2014/155747
PCT Pub. Date: Oct. 2, 2014

(65) Prior Publication Data
US 2016/0062645 A1    Mar. 3, 2016

(51) Int. Cl.
*G06F 3/041* (2006.01)
*G06F 3/0488* (2013.01)
(Continued)

(52) U.S. Cl.
CPC ............ *G06F 3/04886* (2013.01); *G06T 3/60* (2013.01); *G09G 5/00* (2013.01); *G09G 5/36* (2013.01);
(Continued)

(58) Field of Classification Search
CPC ... G96F 3/04886; G06T 3/60; G09G 2320/06; G09G 5/38
(Continued)

(56) References Cited

U.S. PATENT DOCUMENTS 5,832,323 A * 11/1998 Goto ...................... G03B 17/00
                                                                        345/167
5,977,938 A * 11/1999 Iwasa .................. G02B 27/2292
                                                                        345/32
(Continued)

FOREIGN PATENT DOCUMENTS

| JP | 2008-131616 A | 6/2008 |
| JP | 2010-113503 A | 5/2010 |
| WO | WO2013/022000 A1 | 2/2013 |

OTHER PUBLICATIONS

English Translation of International Search Report for PCT/JP2013/059770 dated May 14, 2013.

*Primary Examiner* — Prabodh M Dharia

(74) *Attorney, Agent, or Firm* — Hubbs, Enatsky & Inoue PLLC

(57) ABSTRACT

An inclination detection unit detects an inclination of the terminal device. A screen image rotation unit rotates a screen image when an inclination state of the terminal device detected by the inclination detection unit becomes a predetermined state. A touched position detection unit detects a position touched by a user. A comparison unit compares the position touched by the user before the inclination state of the terminal device becomes the predetermined state and the position touched by the user when or after the inclination state of the terminal device becomes the predetermined state. A suppression unit suppresses a rotation of the screen image by the screen image rotation unit, based on a result of comparison by the comparison unit.

10 Claims, 9 Drawing Sheets

(51) Int. Cl.
  *G09G 5/00* (2006.01)
  *G09G 5/36* (2006.01)
  *G06T 3/60* (2006.01)
  *G09G 5/38* (2006.01)
(52) U.S. Cl.
  CPC ....... *G09G 5/38* (2013.01); *G06F 2200/1614* (2013.01); *G06F 2200/1637* (2013.01); *G09G 2320/06* (2013.01)
(58) Field of Classification Search
  USPC ..... 345/156–184, 619, 649, 658; 348/333.12
  See application file for complete search history.

(56) References Cited

U.S. PATENT DOCUMENTS

| | | | | |
|---|---|---|---|---|
| 6,411,285 | B1* | 6/2002 | Miyazawa | G06F 3/0418 345/173 |
| 7,164,432 | B1* | 1/2007 | Amemiya | G06F 1/1616 345/649 |
| 8,970,765 | B2* | 3/2015 | Higashimoto | G06F 3/04815 345/649 |
| 9,646,576 | B2* | 5/2017 | Masuko | G06F 1/1686 |
| 2008/0278437 | A1* | 11/2008 | Barrus | H04N 1/00204 345/156 |
| 2009/0267291 | A1* | 10/2009 | Tabata | G03G 15/5029 271/225 |
| 2010/0125816 | A1* | 5/2010 | Bezos | G06F 1/1626 715/863 |
| 2010/0188355 | A1* | 7/2010 | Sugita | G06F 3/012 345/173 |
| 2011/0074671 | A1* | 3/2011 | Shimosato | H04N 5/23293 345/156 |
| 2011/0122085 | A1* | 5/2011 | Chang | G06F 1/1626 345/174 |
| 2011/0187660 | A1* | 8/2011 | Hirata | G06F 3/03547 345/173 |
| 2012/0057064 | A1* | 3/2012 | Gardiner | G06F 1/1626 348/333.12 |
| 2012/0105318 | A1* | 5/2012 | Nutaro | G06F 3/04815 345/157 |
| 2012/0127102 | A1* | 5/2012 | Uenohara | G06F 3/0486 345/173 |
| 2012/0242683 | A1* | 9/2012 | Asai | G09G 5/00 345/619 |
| 2012/0249540 | A1* | 10/2012 | Yoshino | H04N 13/0438 345/419 |
| 2012/0313970 | A1* | 12/2012 | Akiyama | G09G 3/20 345/651 |
| 2012/0320249 | A1* | 12/2012 | Higashimoto | G06F 3/04815 348/333.05 |
| 2013/0038634 | A1* | 2/2013 | Yamada | G09G 5/00 345/649 |
| 2013/0069988 | A1* | 3/2013 | Kamei | G06F 1/1637 345/658 |
| 2013/0162542 | A1* | 6/2013 | Badali | G06F 1/1626 345/169 |
| 2013/0176268 | A1* | 7/2013 | Li | G06F 3/044 345/174 |
| 2014/0009419 | A1* | 1/2014 | Kim | G06F 3/0412 345/173 |
| 2014/0057675 | A1* | 2/2014 | Meyers | H04M 1/72594 455/556.1 |
| 2014/0118487 | A1* | 5/2014 | Shikata | H04N 5/232 348/36 |
| 2014/0160529 | A1* | 6/2014 | Maeda | G03G 15/5016 358/1.15 |
| 2014/0293002 | A1* | 10/2014 | Furumura | G03B 17/18 348/36 |
| 2014/0300693 | A1* | 10/2014 | Hirata | H04N 5/23216 348/39 |
| 2014/0307001 | A1* | 10/2014 | Aizawa | G09G 5/38 345/659 |
| 2014/0313020 | A1* | 10/2014 | Miura | G04G 13/021 340/309.7 |
| 2015/0035991 | A1* | 2/2015 | Sachs | H04N 5/23216 348/187 |
| 2015/0091824 | A1* | 4/2015 | Hori | G06F 1/1694 345/173 |
| 2015/0100919 | A1* | 4/2015 | Takagi | H04N 1/00411 715/798 |
| 2015/0145788 | A1* | 5/2015 | Hori | G06F 3/017 345/173 |
| 2015/0181110 | A1* | 6/2015 | Ishihara | H04N 5/23245 348/333.02 |
| 2015/0194135 | A1* | 7/2015 | Higashi | H04N 21/4126 345/2.2 |
| 2015/0293692 | A1* | 10/2015 | Uenohara | G06F 3/0486 345/174 |
| 2015/0347001 | A1* | 12/2015 | Motoi | G06F 3/03545 345/173 |
| 2015/0352438 | A1* | 12/2015 | Suzuki | A63F 13/26 345/156 |
| 2016/0163289 | A1* | 6/2016 | Masuko | G06F 1/1686 345/659 |
| 2016/0191808 | A1* | 6/2016 | Higashimoto | G06F 3/04815 348/333.12 |

* cited by examiner

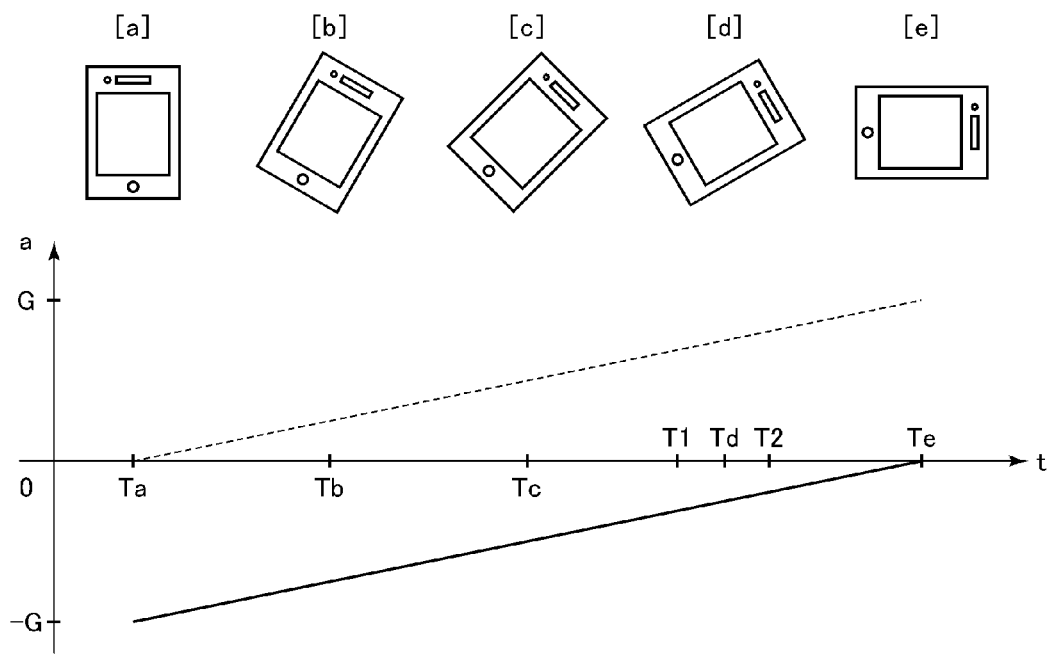

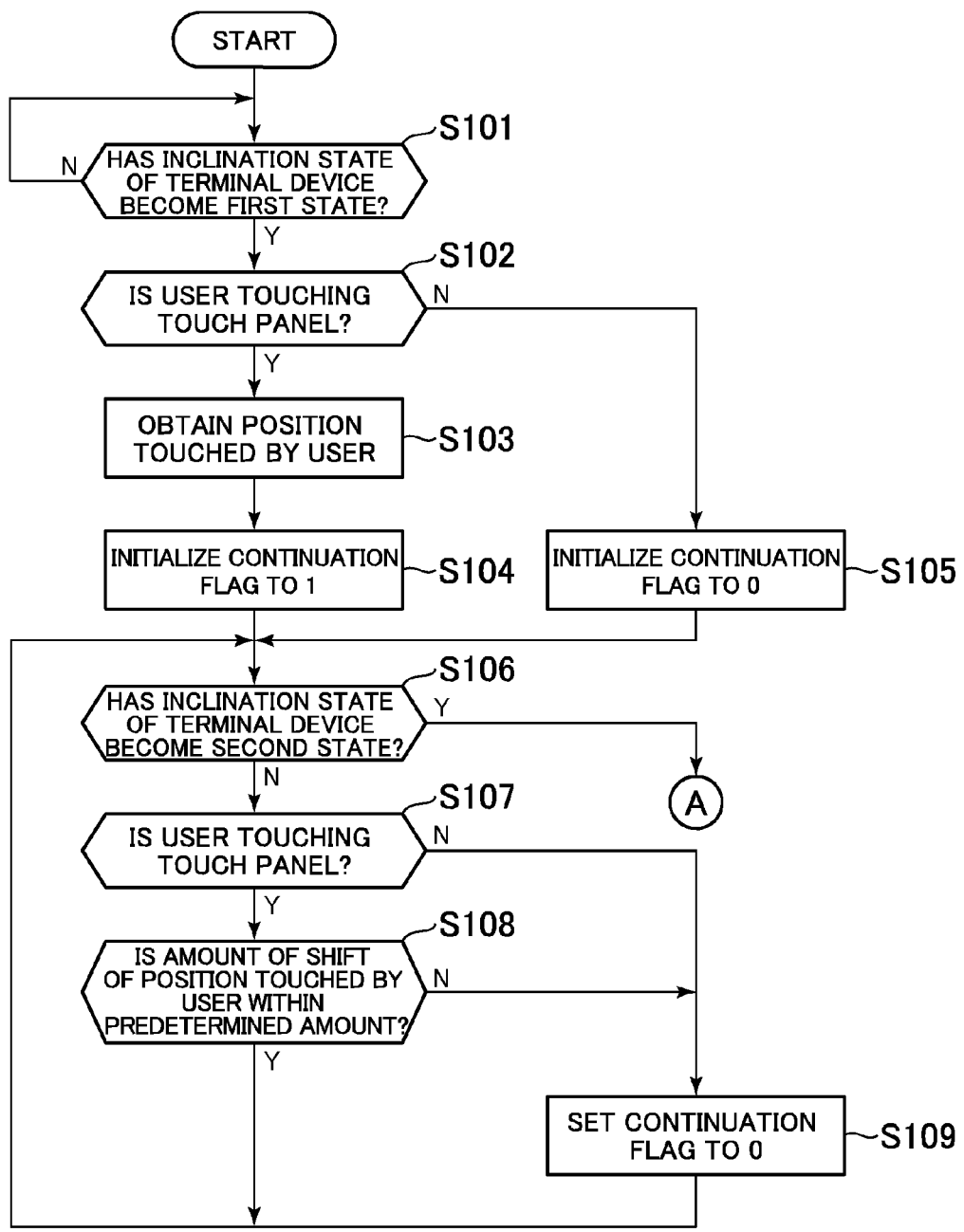

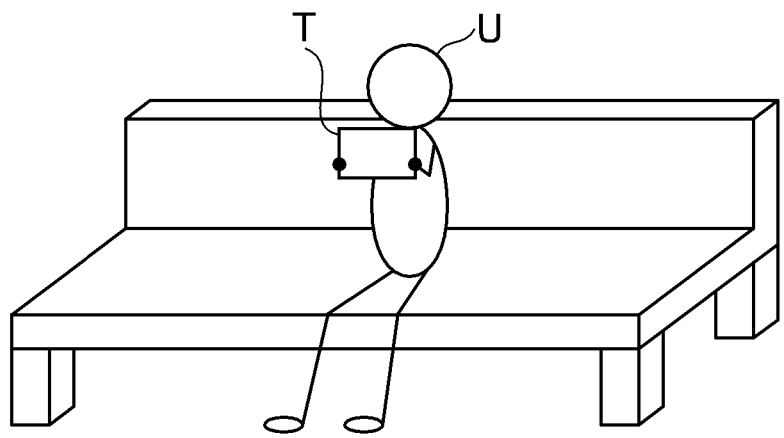

```
A B C D E F G H I J K L M
N O P Q R S T U V W X Y
Z 0 1 2 3 4 5 6 7 8 9 A
B C D E F G H I J K L M
N O P Q R S T U V W X Y
```

TERMINAL DEVICE, CONTROL METHOD FOR TERMINAL DEVICE, PROGRAM, AND INFORMATION STORAGE MEDIUM

TECHNICAL FIELD

The present invention relates to a terminal device, a control method for a terminal device, a program, and an information storage medium.

BACKGROUND ART

There has been known a terminal device having a function for automatically rotating a screen image displayed on a display unit in accordance with the posture (inclination) of the terminal device (for example, Patent Literature 1). In such a terminal device, for example, when user U holds the terminal device T in a vertical state, as shown in FIG. 12 (in other words, a state in which the terminal device T looks long in the vertical direction when seen from user U), the orientation of the screen image is set parallel to the longitudinal direction of the terminal device T, as shown in FIG. 13. Moreover, for example, when user U changes the holding position of the terminal device T and holds the terminal device T in a horizontal state, as shown in FIG. 14 (in other words, a state in which the terminal device T looks long in the horizontal direction when seen from user U), the screen image rotates whereby the orientation of the screen image is set parallel to the shorter side direction of the terminal device T, as shown in FIG. 15.

CITATION LIST

Patent Literature

Patent Literature 1: JP 2008-131616 A

SUMMARY OF INVENTION

Technical Problem

However, there may be a case in which the automatic screen image rotation function should be temporarily suppressed, depending on a position of user U during use.

For example, in the case where the position of user U changes from the position in which user U sits on a sofa and holds the terminal device T in a vertical state, as shown in FIG. 12, to the position in which user U lies on the sofa and uses the terminal device T, as shown in FIG. 16, the screen image will rotate in a manner similar to the case shown in FIGS. 14 and 15. In this case, the screen image seen from user U is changed to look like the one shown in FIG. 17, for example, which may not be easy to see.

Generally, in the terminal device, it is possible to invalidate the automatic screen image rotation function. Therefore, when the automatic screen image rotation function is invalidated, the above described inconvenience is not caused. However, once the automatic screen image rotation function is invalidated, the screen image will not automatically rotate even when automatic screen image rotation is desired (for example, when a position of user U while using the terminal device T changes from the one shown in FIG. 12 to the one shown in FIG. 14.)

As described above, user U does not want to permanently suppress the automatic screen image rotation function, but wants to temporarily suppress the automatic screen image rotation function in a specific case (for example, when a position of user U while using the terminal device T changes from the one shown in FIG. 12 to the one shown in FIG. 16). Regarding this point, according to a conventional terminal device, it is necessary to change the setting of the terminal device even when temporal suppression of the automatic screen image rotation function is desired, similarly as in the case of permanently suppressing the automatic screen image rotation function, which user U may find troublesome.

The present invention has been conceived in view of the above, and aims to provide a terminal device, a control method for a terminal device, a program, and an information storage medium for which it is not necessary to change the setting of the terminal device in a manner as the manner for permanently suppressing the automatic screen image rotation function, to temporarily suppress the automatic screen image rotation function.

Solution to Problem

In order to achieve the above described object, a terminal device according to a present invention is a terminal device having a display unit for displaying a screen image, including an inclination detection unit for detecting an inclination of the terminal device; a screen image rotation unit for rotating the screen image when an inclination state of the terminal device detected by the inclination detection unit becomes a predetermined state; a touched position detection unit for detecting a position touched by a user; a comparison unit for comparing a position touched by the user before the inclination state of the terminal device becomes the predetermined state and a position touched by the user when or after the inclination state of the terminal device becomes the predetermined state, and a suppression unit for suppressing rotation of the screen image by the screen image rotation unit, based on a result of comparison by the comparison unit.

A control method for a terminal device according to the present invention is a control method for a terminal device having a display unit for displaying a screen image, the method including a step of obtaining a result of detection by an inclination detection unit for detecting an inclination of the terminal device; a screen image rotation step of rotating the screen image when an inclination state of the terminal device detected by the inclination detection unit becomes a predetermined state; a step of obtaining a result of detection by a touched position detection unit for detecting a position touched by a user; a comparison step of comparing a position touched by the user before the inclination state of the terminal device becomes the predetermined state and a position touched by the user when or after the inclination state of the terminal device becomes the predetermined state, and a suppression step of suppressing a rotation of the screen image at the screen image rotation step, based on a result of comparison at the comparison step.

A program according to the present invention is a program for causing a terminal device, having a display unit for displaying a screen image, to execute a step of obtaining a result of detection by an inclination detection unit for detecting an inclination of the terminal device; a screen image rotation step of rotating the screen image when an inclination state of the terminal device detected by the inclination detection unit becomes a predetermined state; a step of obtaining a result of detection by a touched position detection unit for detecting a position touched by a user; a comparison step of comparing a position touched by the user before the inclination state of the terminal device becomes the predetermined state and a position touched by the user when or after the inclination state of the terminal device becomes the predetermined state, and a suppression step of suppressing a rotation of the screen image at the screen image rotation step, based on a result of comparison at the comparison step.

An information storage medium according to the present invention is a computer readable information storage medium storing a program for causing a computer readable information storage medium storing a program for causing a terminal device, having a display unit for displaying a screen image, to execute a step of obtaining a result of detection by an inclination detection unit for detecting an inclination of the terminal device; a screen image rotation step of rotating the screen image when an inclination state of the terminal device detected by the inclination detection unit becomes a predetermined state; a step of obtaining a result of detection by a touched position detection unit for detecting a position touched by a user; a comparison step of comparing a position touched by the user before the inclination state of the terminal device becomes the predetermined state and a position touched by the user when or after the inclination state of the terminal device becomes the predetermined state, and a suppression step of suppressing a rotation of the screen image at the screen image rotation step, based on a result of comparison at the comparison step.

In one embodiment of the present invention, the terminal device may further include a suppression continuation unit for continuing suppression of the rotation of the screen image by the screen image rotation unit even when the position touched by the user is no longer detected by the touched position detection unit after the rotation of the screen image by the screen image rotation unit is suppressed by the suppression unit.

In one embodiment of the present invention, the terminal device may further include a release unit for releasing the suppression by the suppression continuation unit when a change of the inclination state of the terminal device detected by the inclination detection unit becomes equal to or greater than a threshold in the case where the rotation of the screen image by the screen image rotation unit is continuously suppressed by the suppression continuation unit.

In one embodiment of the present invention, the comparison unit may determine whether or not an amount of shift between the position touched by the user before the inclination state of the terminal device becomes the predetermined state and the position touched by the user when or after the inclination state of the terminal device becomes the predetermined state is within a predetermined amount, and the suppression unit may suppress the rotation of the screen image by the screen image rotation unit when the amount of shift between the position touched by the user before the inclination state of the terminal device becomes the predetermined state and the position touched by the user when or after the inclination state of the terminal device becomes the predetermined state is within the predetermined amount.

In one embodiment of the present invention, the suppression unit may suppress the rotation of the screen image by the screen image rotation unit when the position touched by the user is continuously detected by the touched position detection unit during a period from a time before the inclination state of terminal device becomes the predetermined state to a time when or after the inclination state of the terminal device becomes the predetermined state, and an amount of shift of the position touched by the user during the period is within a predetermined amount.

In one embodiment of the present invention, the terminal device may further include a unit for executing predetermined processing when a state where the amount of shift of the position touched by the user is within a first predetermined amount continues for a first predetermined period of time or longer, the suppression unit may suppress the rotation of the screen image by the screen image rotation unit when the state continues for the first predetermined period of time or longer and the inclination state of the terminal device becomes the predetermined state before an elapse of a second predetermined time subsequent to a continuation of the state for the first predetermined period of time, and the suppression unit may be configured not to suppress the rotation of the screen image by the screen image rotation unit when the state continues for the first predetermined period of time or longer and the inclination state of the terminal device becomes the predetermined state after the elapse of the second predetermined time subsequent to the continuation of the state for the first predetermined period of time.

In one embodiment of the present invention, the terminal device may further include a unit for executing letter input when the user stops touching the screen image, based on the position touched by the user, and the suppression unit may include a unit for suppressing the rotation of the screen image by the screen image rotation unit, even in a case where there is a moment at which the position touched by the user is not detected by the touched position detection unit during the period, if a time difference between the moment and a moment at which the letter input is executed is within a threshold.

In one embodiment of the present invention, the suppression unit may include a unit for suppressing the rotation of the screen image by the screen image rotation unit, even in a case where there is a moment at which the position touched by the user is not detected by the touched position detection unit during the period, if a shift between a position touched by the user before the moment and a position touched by the user after the moment is within a threshold.

Advantageous Effects of Invention

According to the present invention, in order to temporarily suppress the automatic screen image rotation function, it is not necessary to change the setting of the terminal device, in a manner as the manner for permanently suppressing the automatic screen image rotation function.

BRIEF DESCRIPTION OF DRAWINGS

FIG. 4 is a diagram explaining function of a screen image rotation unit (automatic screen image rotation function);

FIG. 5 shows one example of data stored in a storage unit;

FIG. 6 is a flowchart showing one example of processing executed in a terminal device;

FIG. 14 is a diagram explaining a conventional terminal device;

FIG. 15 is a diagram explaining a conventional terminal device;

DESCRIPTION OF EMBODIMENTS

In the following, an example of an embodiment of the present invention will be described in detail based on the drawings.

Figure 1:
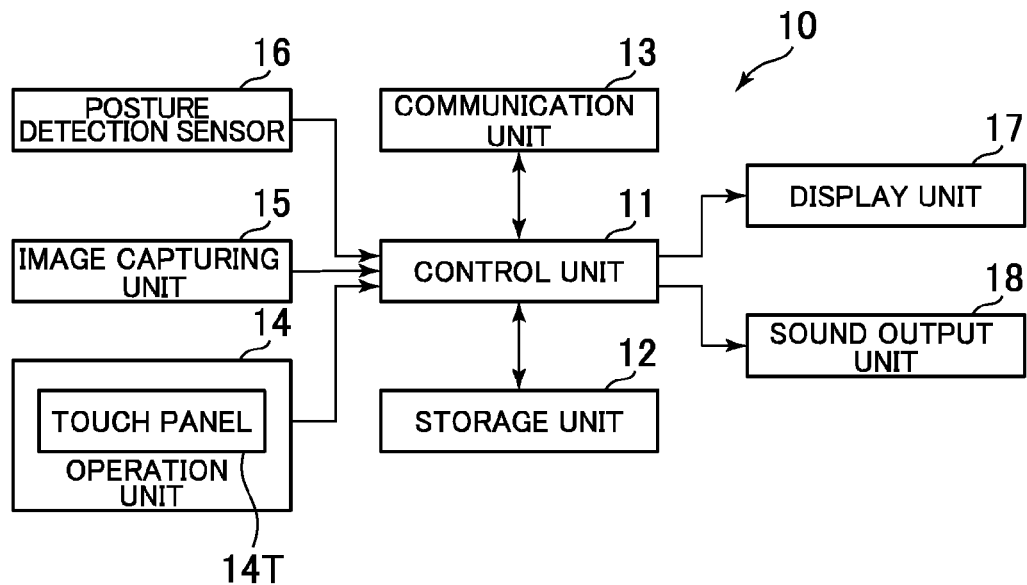
FIG. 1 shows one example of a hardware structure of a terminal device according to an embodiment of the present invention.
Figure 2:
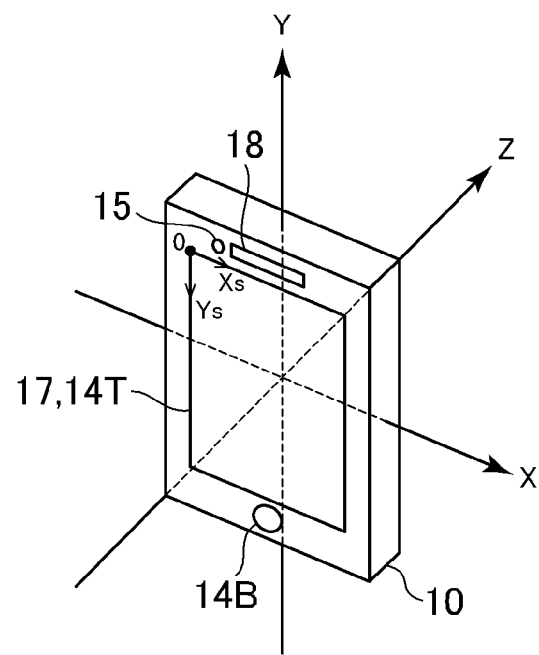
FIG. 2 shows one example of the external appearance of a terminal device according to an embodiment of the present invention.

A terminal device according to an embodiment of the present invention is implemented using, for example, a portable terminal device, such as, for example, a personal digital assistant, a portable phone, a portable game device, or the like. FIG. 1 shows one example of a hardware structure of the terminal device 10 according to this embodiment; FIG. 2 shows one example of the external appearance of the terminal device 10 according to this embodiment.

As shown in FIG. 1, the terminal device 10 includes a control unit 11, a storage unit 12, a communication unit 13, an operation unit 14, an image capturing unit 15, a posture detection sensor 16, a display unit 17, and a sound output unit 18. The control unit 11 includes one or more microprocessors, for example, and executes information processing according to an operating system or a program stored in the storage unit 12. The storage unit 12 includes a main storage unit (for example, a RAM) and an auxiliary storage unit (for example, a hard disk or a solid state drive).

The communication unit 13 is used for data communication with other devices via a communication network. A program and data are supplied to the storage unit 12 of the terminal device 10 via a communication network. Note that the terminal device 10 may include a structural component for reading a program or data stored in an information storage medium such as a memory card, an optical disk, or the like, and the program or data read from the information storage medium may be stored in the storage unit 12.

The operation unit 14 is used by a user to perform an operation. For example, the operation unit 14 includes a button 14B provided on the surface of the terminal device 10 (see FIG. 2). Note that the operation unit 14 may include an operation member (for example, a stick, a lever, or the like) other than the button 14B.

Further, the operation unit 14 includes a designated position detection unit for detecting a position designated by a user within the screen of the display unit 17. For example, the operation unit 14 includes a touch panel 14T formed superimposed on the display unit 17. The touch panel 14T is a typical touch panel, and detects a position touched by a user. As the touch panel 14T, a capacitive touch panel is used, for example. In a capacitive touch panel, one or more positions touched by a user are detected, based on change of charge that is caused when the user touches the surface of the touch panel. Note that a touch panel employing other methods, such as a resistive membrane method or the like, may be used instead as the touch panel 14T. Further, the touch panel 14T may be formed integrally with a liquid crystal display (the display unit).

Information indicating a position touched by a user is supplied to the control unit 11 every predetermined period of time (for example, $1/60^{th}$ of a second). A position touched by a user is expressed as coordinate values of a screen coordinate system, for example. Note that a "screen coordinate system" is a coordinate system such as the one in which the upper left vertex thereof is set as the origin O, the rightward direction is set as the Xs axial positive direction, and the downward direction is set as the Ys axial positive direction, in the condition as shown in FIG. 2, for example. The control unit 11 obtains a position touched by a user, based on the information supplied from the touch panel.

The image capturing unit 15 is an image capture element, such as, for example, a CCD or the like. As shown in FIG. 2, the image capturing unit 15 is set on the surface same as the one on which the display unit 17 is set, and is arranged so that it can capture an image of an object opposed to the display unit 17. Thus, it is possible to capture an image of a user seeing a screen image displayed on the display unit 17, using the image capturing unit 15.

The image capturing unit 15 can capture a static image. Further, the image capturing unit 15 can take a motion picture as well. For example, the image capturing unit 15 captures an image every predetermined period of time (for example, $1/60^{th}$ of a second). A static image or a motion picture captured by the image capturing unit 15 is stored in the storage unit 12.

Note that the image capturing unit 15 is configured to be capable of switching an operation state between an image capturing enabled state and an image capturing waiting state. An "image capturing enabled state" refers to a state in which power is supplied to the image capturing unit 15, being a state in which it is literally possible to capture an image. Meanwhile, an "image capturing waiting state" refers to a state in which power consumption is smaller than that in the image capturing enabled state, and can be rephrased as, for example, an "image capturing disenabled state", a "sleep state", an "off state", or the like.

The posture detection sensor 16 includes one or more sensors for detecting the posture (inclination) of the terminal device 10. For example, the posture detection sensor 16 includes at least one of an acceleration sensor and a gyro sensor.

For example, an acceleration sensor detects accelerations in three axial directions that are orthogonal to each other (the X axial direction, the Y axial direction, and the Z axial direction). As shown in FIG. 2, the terminal device 10 has a rectangular shape, in which the X axis corresponds to the shorter side direction of the terminal device 10, the Y axis corresponds to the longitudinal direction of the same, and the Z axis corresponds to the depth direction of the same.

Further, for example, a gyro sensor detects an angular speed in three mutually orthogonal axes (the X axis, the Y axis, and the Z axis). That is, the gyro sensor detects a rotation amount of the terminal device 10 per unit period of time when the terminal device 10 rotates about the X axis as a rotation axis. Similarly, the gyro sensor also detects a rotation amount of the terminal device 10 per unit period of time when the terminal device 10 rotates about the Y axis as a rotation axis. Further, the gyro sensor detects a rotation amount of the terminal device 10 per unit period of time when the terminal device 10 rotates about the Z axis as a rotation axis.

Information indicating a result of detection by the posture detection sensor 16 is supplied to the control unit 11 every predetermined period of time (for example, $\frac{1}{60}^{th}$ of a second). The control unit 11 determines the posture (inclination) of the terminal device 10, based on a result of detection by the posture detection sensor 16.

For example, the control unit 11 determines the posture (inclination) of the terminal device 10, based on a result of detection by the acceleration sensor. For example, the control unit 11 determines the posture (inclination) of the terminal device 10, based on how the gravitational accelerations are detected as accelerations in the X, Y, and Z axial directions (see FIG. 4 to be described later).

Further, for example, the control unit 11 determines the posture (inclination) of the terminal device 10, based on a result of detection by the gyro sensor. For example, the control unit 11 integrates the angular speed as to each axis detected by the gyro sensor to thereby determine how much the terminal device 10 has rotated about the axis as a rotation axis.

The display unit 17 is a liquid crystal display or an organic EL display, or the like, for example; the sound output unit 18 is a speaker, a headphone terminal, or the like, for example.

As the conventional terminal device, the terminal device 10 according to this embodiment has an automatic screen image rotation function (see FIGS. 12 to 15). In particular, the terminal device 10 according to this embodiment has a function for temporarily suppressing the automatic screen image rotation function. In the following, a structure for implementing this function will be described.

Figure 3:
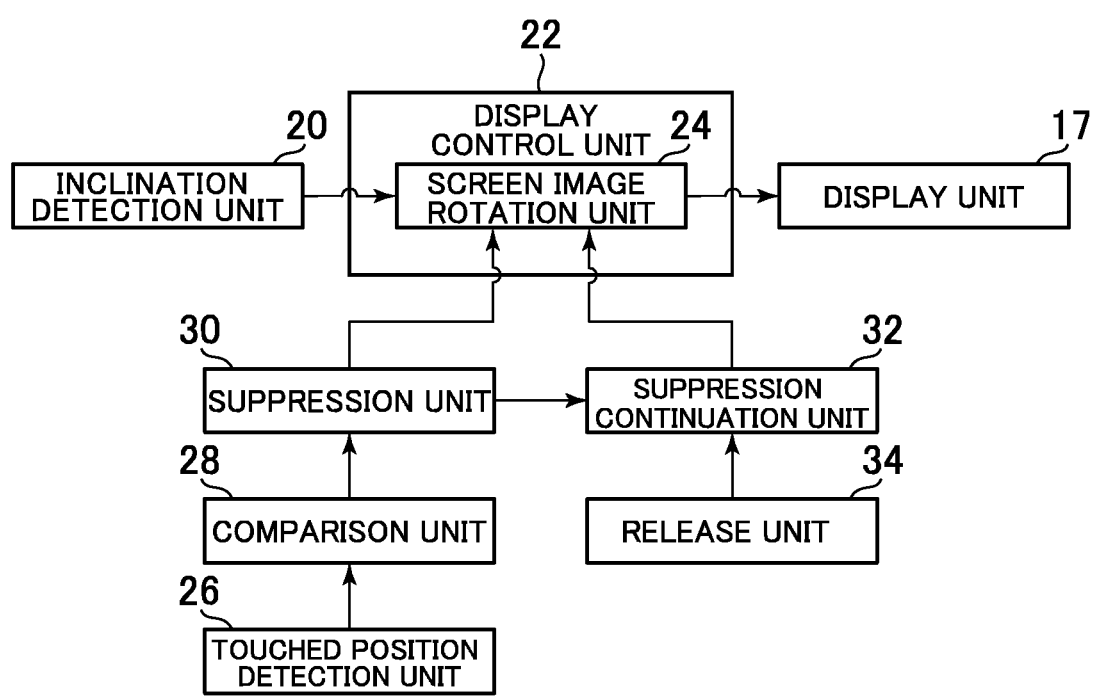
FIG. 3 is a function block diagram of a terminal device according to an embodiment of the present invention.

FIG. 3 is a function block diagram showing function blocks relevant to the above mentioned function among those implemented in the terminal device 10 according to this embodiment. As shown in FIG. 3, the terminal device 10 includes an inclination detection unit 20, a display control unit 22, a touched position detection unit 26, a comparison unit 28, a suppression unit 30, a suppression continuation unit 32, and a release unit 34.

The inclination detection unit 20 will be described. The inclination detection unit 20 detects an inclination of the terminal device 10. In this embodiment, the posture detection sensor 16 (for example, the acceleration sensor) corresponds to the inclination detection unit 20.

The display control unit 22 will be described. The display control unit 22 displays a screen image on the display unit 17. The display control unit 22 includes a screen image rotation unit 24.

The screen image rotation unit 24 is relevant to the automatic screen image rotation function. When the inclination state of the terminal device 10 detected by the inclination detection unit 20 (in other words, the amount of inclination with respect to the gravity direction) becomes a predetermined state, the screen image rotation unit 24 rotates the screen image.

FIG. 4 explains the screen image rotation unit 24. FIG. 4 shows a case in which the terminal device 10 in the vertical state gradually inclines toward the horizontal direction to be in the horizontal state. Further, in FIG. 4, states [a] to [e] are shown as representative states in the process in which the terminal device 10 changes from the vertical state to the horizontal state.

The state [a] is the vertical state. The state [b] is a state inclined toward the horizontal direction with respect to the vertical state by a small amount. The state [c] is a state inclined from the vertical state toward the horizontal direction by an amount greater than that in the state [b]. The state [d] is a state inclined from the vertical state toward the horizontal direction by an amount greater than that in the state [c]. The state [e] is the horizontal state.

Further, the graph shown in FIG. 4 shows one example of a result of detection by the acceleration sensor (the posture detection sensor 16). Note that only gravitational acceleration is taken into consideration here. The solid line in the graph indicates an acceleration in the Y axial direction; the dot line in the graph indicates an acceleration in the X axial direction. The t axis indicates a time axis, and times Ta, Tb, Tc, Td, and Te respectively indicate points of time when the inclination state of the terminal device 10 becomes the states [a], [b], [c], [d], and [e]. The a axis indicates an acceleration, and "G" indicates the gravitational acceleration.

As shown in FIG. 4, in the vertical state (state [a]), the gravitational acceleration is detected as an acceleration in the Y axial negative direction. Further, as the amount of inclination of the terminal device 10 becomes larger, the acceleration in the Y axial direction comes closer to zero, and the acceleration in the X axial direction comes closer to the gravitational acceleration instead. In the horizontal state (state [e]), the gravitational acceleration is detected as an acceleration in the X axial positive direction.

For example, in the case where the orientation of a screen image is parallel to the longitudinal direction of the display unit 17 (the terminal device 10) (FIG. 13), when the inclination state of the terminal device 10 becomes the state [d], the screen image rotation unit 24 rotates the screen image such that the orientation of the screen image is changed to be parallel to the shorter side direction of the display unit 17 (the terminal device 10) (FIG. 15). Note that the screen image rotation unit 24 may rotate the screen image when the inclination state of the terminal device 10 becomes the state [c] and change the orientation of the screen image from being parallel to the longitudinal direction of the display unit 17 to being parallel to the shorter side direction of the display unit 17.

Below, assume a case where the orientation of the screen image is parallel to the shorter side direction of the display unit 17 and the inclination state of the terminal device 10 is changed from the state [e] to the state [a]. In such a case, when the inclination state of the terminal device 10 becomes the state [b], the screen image rotation unit 24 rotates the screen image such that the orientation of the screen image is changed to be parallel to the longitudinal direction of the display unit 17. Note that the screen image rotation unit 24 may rotate the screen image when the inclination state of the terminal device 10 becomes the state [c] and change the orientation of the screen image from being parallel to the shorter side direction of the display unit 17 to being parallel to the longitudinal direction of the display unit 17.

Note that data such as is shown in FIG. 5 is stored in the storage unit 12. The data shown in FIG. 5 includes a display orientation flag and a rotation suppression flag. Note that only the display orientation flag will be described here, and the rotation suppression flag will be described later.

The display orientation flag is information indicating the current display orientation of a screen image. For example, the value "0" or "1" is set as the display orientation flag. For example, the value "0" corresponds to a state in which the orientation of a screen image is parallel to the longitudinal direction of the display unit 17; the value "1" corresponds to a state in which the orientation of a screen image is parallel to the shorter side direction of the display unit 17. That is, when the display orientation flag is "0", the orientation of the screen image is set parallel to the longitudinal direction of the display unit 17, and when the display orientation flag is "1", the orientation of the screen image is set parallel to the shorter side direction of the display unit 17.

The screen image rotation unit 24 changes the display orientation flag from "0" to "1" when the orientation of a screen image changes from being parallel to the longitudinal direction of the display unit 17 to being parallel to the shorter side direction of the display unit 17. Further, the screen image rotation unit 24 changes the display orientation flag from "1" to "0" when the orientation of a screen image changes from being parallel to the shorter side direction of the display unit 17 to being parallel to the longitudinal direction of the display unit 17.

The touched position detection unit 26 will be described. The touched position detection unit 26 detects a position touched by a user. In this embodiment, the touch panel 14T corresponds to the touched position detection unit 26.

The comparison unit 28 will be described. The comparison unit 28 compares the position touched by a user before the inclination state of the terminal device 10 becomes a predetermined state and the position touched by the user when or after the inclination state of the terminal device 10 becomes the predetermined state.

For example, in the case where the screen image rotation unit 24 is configured to rotate a screen image when the inclination state of the terminal device 10 becomes the state [d], the state [d] corresponds to the above described "predetermined state".

In this case, for example, the comparison unit 28 compares the position touched by a user at time T1 which is a point of time immediately before time Td (a point of time when the inclination state of the terminal device 10 becomes the state [d]), and the position touched by the user at time T2 which is a point of time immediately after time Td.

For example, the comparison unit 28 determines whether or not the amount of shift between the position touched by a user at time T1 and the position touched by the user at time T2 is within a predetermined amount. That is, the comparison unit 28 determines whether the distance between the position touched by the user at time T1 and the position touched by the user at time T2 is equal to or shorter than a predetermined distance.

Note that the comparison unit 28 may compare the position touched by a user at time T1 and the position touched by the user at time Td.

The suppression unit 30 will be described. The suppression unit 30 suppresses screen image rotation by the screen image rotation unit 24, based on a result of comparison by the comparison unit 28.

For example, when the result of comparison by the comparison unit 28 is a predetermined result, the suppression unit 30 suppresses screen image rotation by the screen image rotation unit 24. Meanwhile, when the result of comparison by the comparison unit 28 is not a predetermined result, the suppression unit 30 does not suppress screen image rotation by the screen image rotation unit 24.

For example, in the case where the comparison unit 28 determines that the amount of shift of a position touched by a user is within a predetermined amount, the suppression unit 30 suppresses screen image rotation by the screen image rotation unit 24. Meanwhile, in the case where the comparison unit 28 determines that the amount of shift of a position touched by a user is not within a predetermined amount, the suppression unit 30 does not suppress screen image rotation by the screen image rotation unit 24.

In this embodiment, in the case where the position touched by a user is continuously detected by the touched position detection unit 26 during the period from time T1 to time T2 (or time Td) and the amount of shift of the position touched by the user during the above period is within a predetermined amount, the suppression unit 30 suppresses screen image rotation by the screen image rotation unit 24.

The suppression continuation unit 32 will be described. The suppression continuation unit 32 keeps suppressing screen image rotation by the screen image rotation unit 24 even when the position touched by the user is no longer detected by the touched position detection unit 26 after the suppression unit 30 suppresses screen image rotation by the screen image rotation unit 24.

In the case where screen image rotation by the screen image rotation unit 24 is suppressed by the suppression unit 30, the suppression continuation unit 32 updates the rotation suppression flag (FIG. 5). The rotation suppression flag is information indicating whether or not to suppress screen image rotation by the screen image rotation unit 24. For example, either the value "0" or "1" is set as the rotation suppression flag. For example, the value "0" indicates that screen image rotation by the screen image rotation unit 24 is not suppressed; the value "1" indicates that screen image rotation by the screen image rotation unit 24 is suppressed.

In the case where screen image rotation by the screen image rotation unit 24 is suppressed by the suppression unit 30, the suppression continuation unit 32 updates the rotation suppression flag to "1". While the rotation suppression flag is set to "1", screen image rotation by the screen image rotation unit 24 is not carried out.

Figures 12, 13:
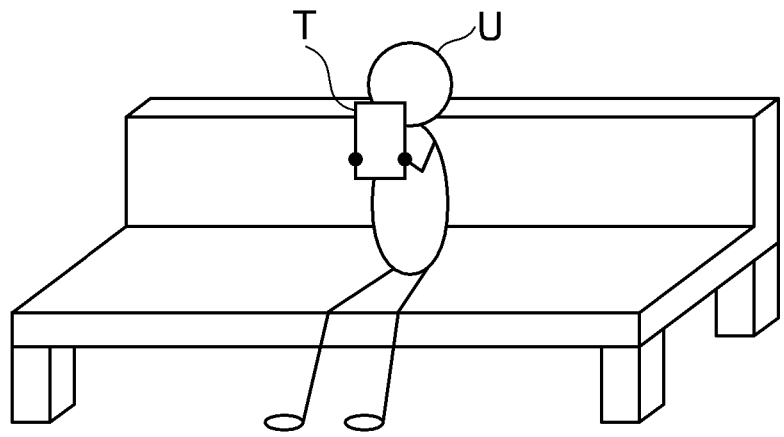
FIG. 12 is a diagram explaining a conventional terminal device.
FIG. 13 is a diagram explaining a conventional terminal device.
Figures 16, 17:
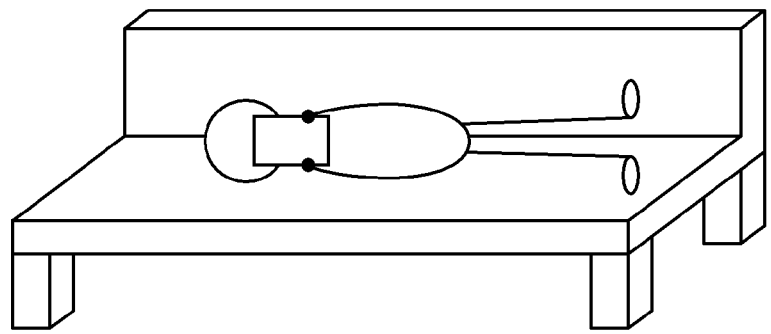
FIG. 16 is a diagram explaining a conventional terminal device.
FIG. 17 is a diagram explaining a conventional terminal device.

As to this point, according to the comparison unit 28 and the suppression unit 30, in the case where a user lies on the sofa from a position to sit on a sofa and use the terminal device 10 (that is, in the case where the position of the user changes from the one shown in FIG. 12 to the one shown in FIG. 16), screen image rotation by the screen image rotation unit 24 is suppressed as long as the user keeps touching the same position within the touch panel 14T. As a result, for example, the screen image seen from the user lying on the sofa (FIG. 16) looks like a screen image as shown in FIG. 13, not like a screen image as shown in FIG. 17.

Further, according to the suppression continuation unit 32, screen image rotation by the screen image rotation unit 24 is continuously suppressed even after the user has lain on the sofa (that is, after the position of the user has changed to the one shown in FIG. 16). That is, the screen image seen from the user remains to be as shown in FIG. 13, for example, even while the user is lying on the sofa.

The release unit 34 will be described. The release unit 34 releases suppression by the suppression continuation unit 32. In this embodiment, the release unit 34 updates the rotation suppression flag to "0" to thereby release suppression by the suppression continuation unit 32.

For example, in the case where the amount of change of the inclination state of the terminal device 10 detected by the inclination detection unit 20 becomes equal to or greater than a threshold while screen image rotation by the screen image rotation unit 24 is continuously suppressed by the suppression continuation unit 32, the release unit 34 releases suppression by the suppression continuation unit 32. According to such a release unit 34, when a user largely changes the inclination of the terminal device 10, suppression by the suppression continuation unit 32 is released and the automatic screen image rotation function becomes valid.

In the following, processing that is executed in the terminal device 10 to implement the above described function blocks will be described.

FIG. 6 is a flowchart showing one example of processing for temporarily suppressing the automatic screen image rotation function. The control unit 11 executes the processing shown in FIG. 6 according to a program, to thereby function as the display control unit 22 (the screen image rotation unit 24), the comparison unit 28, the suppression unit 30, and the suppression continuation unit 32.

Assume here a case in which the inclination state of the terminal device 10 is changed from the state [a] to the state [e], as shown in FIG. 4. Also, assume a case in which a screen image is rotated when the inclination state of the terminal device 10 becomes the state [d].

As shown in FIG. 6, the control unit 11 determines whether or not the inclination state of the terminal device 10 has become the first predetermined state (S101).

Note here that the "first predetermined state" refers to a state prior to the state [d] shown in FIG. 4. For example, a state immediately before the state [d] corresponds to the "first predetermined state". Specifically, the inclination state of the terminal device 10 at time T1 shown in FIG. 4 corresponds to the "first predetermined state".

Whether or not the inclination state of the terminal device 10 has become the first predetermined state is determined based on a result of detection by the acceleration sensor (the posture detection sensor 16). Alternatively, whether or not the inclination state of the terminal device 10 has become a first predetermined state may be determined based on a result of detection by the gyro sensor (the posture detection sensor 16).

When it is determined that the inclination state of the terminal device 10 has become the first predetermined state, the control unit 11 determines whether or not the user is touching the touch panel 14T (S102).

When the user is touching the touch panel 14T, the control unit 11 obtains the position touched by the user (S103). In addition, the control unit 11 initializes the continuation flag to "1" (S104).

Note that the "continuation flag" serves to indicate whether or not a user is continuously touching the touch panel 14T, and whether or not the amount of shift of the position touched by the user is within a predetermined amount. When the continuation flag is "1", it means that a user is continuously touching the touch panel 14T, and that the amount of shift of the position touched by the user is within a predetermined amount.

Meanwhile, when the user is not touching the touch panel 14T, the control unit 11 initializes the continuation flag to "0" (S105).

After execution of step S104 or step S105, the control unit 11 determines whether or not the inclination state of the terminal device 10 has become a second predetermined state (S106).

Note here that a "second predetermined state" refers to a state after the state [d] shown in FIG. 4. For example, a state immediately after the state [d] corresponds to the "second predetermined state". For example, the inclination state of the terminal device 10 at time T2 shown in FIG. 4 corresponds to the "second predetermined state". Note that the "second predetermined state" may be the state [d].

For example, whether or not the inclination state of the terminal device 10 has become the second predetermined state is determined based on a result of detection by the acceleration sensor (the posture detection sensor 16). Alternatively, whether or not the inclination state of the terminal device 10 has become the second predetermined state may be determined based on a result of detection by the gyro sensor (the posture detection sensor 16).

When it is determined that the inclination state of the terminal device 10 has not become the second predetermined state, the control unit 11 determines whether or not the user is touching the touch panel 14T (S107).

When the user is touching the touch panel 14T, the control unit 11 determines whether or not the amount of shift of the position touched by the user is within a predetermined amount (S108). That is, the control unit 11 determines whether or not the amount of shift between the position touched by the user obtained at step S103 and the position currently touched by the user is within a predetermined amount. That is, the control unit 11 determines whether or not the distance between the position touched by the user obtained at S103 and the position currently touched by the user is equal to or shorter than a predetermined distance.

When the amount of shift of the position touched by the user is within the predetermined amount, the control unit 11 executes step S106 again.

When it is determined at step S107 that the user is not touching the touch panel 14T, the control unit 11 sets the continuation flag to "0" (S109). Also, when it is determined at step S108 that the amount of shift of the position touched by the user is not within the predetermined amount, the control unit 11 sets the continuation flag to "0" (S109).

Figure 7:
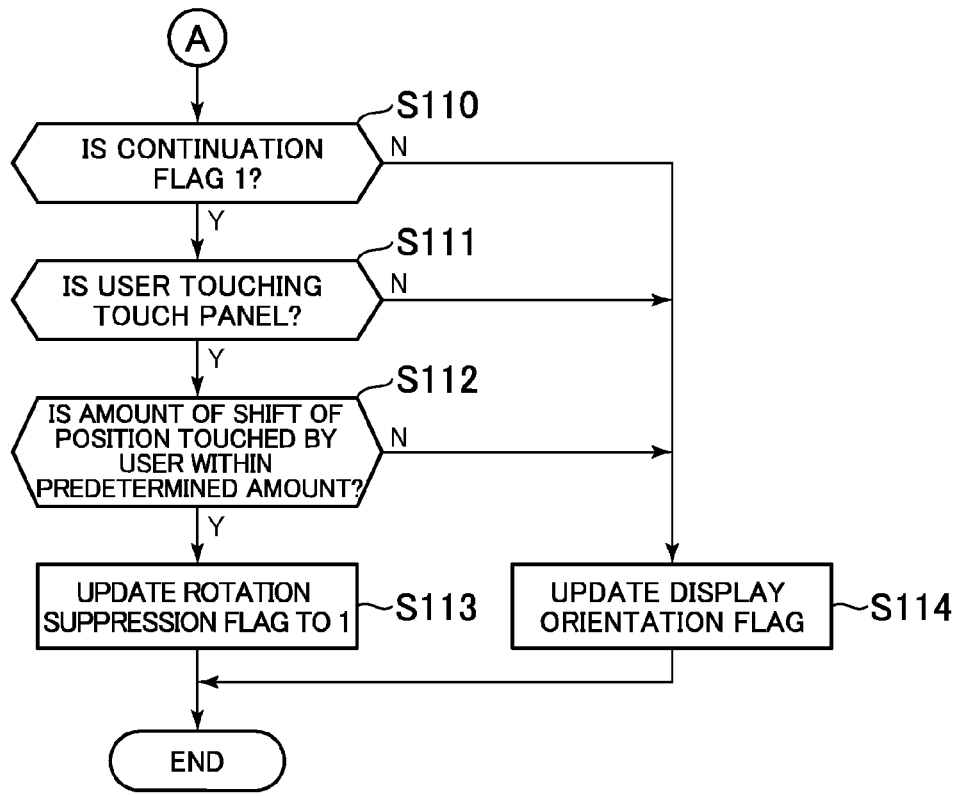
FIG. 7 is a flowchart showing one example of processing executed in a terminal device.

When it is determined at step S106 that the inclination state of the terminal device 10 has become the second predetermined state, the control unit 11 determines whether or not the continuation flag is "1", as shown in FIG. 7 (S110).

When the continuation flag is not "1" (that is, when the continuation flag is "0"), the control unit 11 changes the display orientation flag (S114). That is, the control unit 11 changes the display orientation flag from "0" to "1". In this case, the screen image rotates, and the orientation of the screen image is switched from being parallel to the longitudinal direction of the display unit 17 to being parallel to the shorter side direction of the display unit 17.

Meanwhile, when the continuation flag is "1", the control unit 11 determines whether or not the user is touching the touch panel 14T (S111). When the user is not touching the touch panel 14T, the control unit 11 changes the display orientation flag (S114). That is, the control unit 11 changes the display orientation flag from "0" to "1". In this case, the screen image rotates, and the orientation of the screen image is switched from being parallel to the longitudinal direction of the display unit 17 to being parallel to the shorter side direction of the display unit 17.

Meanwhile, when the user is touching the touch panel 14T, the control unit 11 determines whether or not the amount of shift of the position touched by the user is within a predetermined amount (S112). That is, the control unit 11 determines whether or not the amount of shift between the position touched by the user obtained at S103 and the position currently touched by the user is within the predetermined amount. That is, the control unit 11 determines whether or not the distance between the position touched by the user obtained at S103 and the position currently touched by the user is equal to or shorter than a predetermined distance.

When the amount of shift of the position touched by the user is not within the predetermined amount, the control unit 11 changes the display orientation flag (S114). That is, the control unit 11 changes the display orientation flag from "0" to "1". In this case, the screen image rotates, and the orientation of the screen image is switched from being parallel to the longitudinal direction of the display unit 17 to being parallel to the shorter side direction of the display unit 17.

Meanwhile, when the amount of shift of the position touched by the user is within the predetermined amount, the control unit 11 changes the rotation suppression flag (S113). For example, the control unit 11 changes the rotation suppression flag from "0" to "1". In this case, the automatic screen image rotation function becomes invalid, and the screen image no longer rotates.

Figure 8:
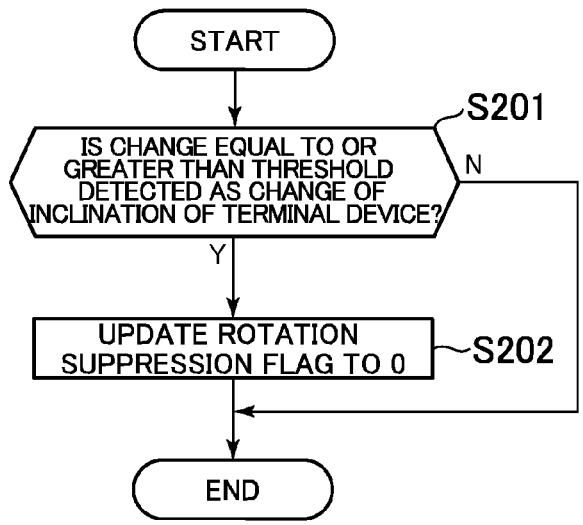
FIG. 8 is a flowchart showing another example of processing executed in a terminal device.

FIG. 8 shows one example of processing that is executed by the control unit 11 every predetermined period of time when the rotation suppression flag is set to "1". The control unit 11 executes the processing shown in FIG. 8 according to a program to thereby function as the release unit 34.

As shown in FIG. 8, the control unit 11 determines whether or not a change equal to or greater than a threshold has been detected as a change of the inclination state of the terminal device 10 (S201). When it is determined that a change equal to or greater than the threshold has been detected, the control unit 11 updates the rotation suppression flag from "1" to "0" (S202). In this case, the automatic screen image rotation function becomes valid, and resultantly, the screen image rotates in accordance with the inclination of the terminal device 10.

According to the above described terminal device 10, as long as a user keeps touching substantially the same position within the touch panel 14T, it becomes possible to temporarily suppress the automatic screen image rotation function. For example, when a user in a position to use the terminal device 10 while sitting on a sofa lies on the sofa (that is, when the position of the user changes from the one shown in FIG. 12 to the one shown in FIG. 16), the automatic screen image rotation function is temporarily suppressed as long as the user keeps touching substantially the same position on the touch panel 14T. Thus, according to the terminal device 10, when it is desired to temporarily suppress the automatic screen image rotation function, it is no longer necessary to change the setting of the terminal device 10 in the manner similar to the manner for permanently suppressing the automatic screen image rotation function. That is, according to the terminal device 10, the automatic screen image rotation function is temporarily suppressed without causing a user to feel bothered.

Note that the present invention is not limited to the above described embodiment.

[1] In the above described embodiment, in the case, for example, where a user keeps touching substantially the same position on the touch panel 14T during the period from time T1 to time T2 (or time Td) shown in FIG. 4, the automatic screen image rotation function is suppressed.

Thus, in the case where the user releases the finger from the touch panel 14T during the period from time T1 to time T2 (or time Td) shown in FIG. 4 (that is, in the case where the user removes his finger from the touch panel 14T), the automatic screen image rotation function is not suppressed. However, it may be arranged that the automatic screen image rotation function is suppressed exceptionally in a predetermined case.

Figure 9:
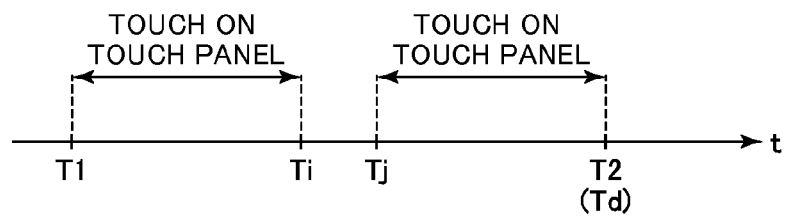
FIG. 9 is a diagram explaining a modified example of a terminal device.

FIG. 9 explains a case in which the automatic screen image rotation function is exceptionally suppressed. Times T1, T2, and Td in FIG. 9 are similar to times T1, T2, and Td in FIG. 4. In the example shown in FIG. 9, a user keeps touching the touch panel 14T during the period from time T1 to time Ti, and has ceased to touch the touch panel 14T at time Ti. Then, the user begins to touch the touch panel 14T again at time Tj and keeps touching the touch panel 14T during the period from time Tj to time T2 (Td). That is, in the example shown in FIG. 9, the user is not touching the touch panel 14T during the period from time Ti to time Tj.

In the following, an example of a case in which the automatic screen image rotation function is exceptionally suppressed will be described, with reference to FIG. 9.

[1-1] A first example will be described. For example, even in the case where there is, during the period from time T1 to time T2 (or Td), a moment at which a user is not touching the touch panel 14T (from time Ti to time Tj), the suppression unit 30 may suppress screen image rotation by the screen image rotation unit 24 when the shift between the position touched by the user at time Tj and the position touched by the user at time T1 (or time Ti) is within a threshold.

According to this aspect, even in the case where a user is temporarily not touching the touch panel 14T, the automatic screen image rotation function is suppressed if the user immediately touches substantially the same position on the touch panel 14T.

[1-2] A second example will be described. For example, even in the case where there is, during the period from time T1 to time T2 (or Td), a moment at which a user is not touching the touch panel 14T (from time Ti to time Tj), the suppression unit 30 may suppress screen image rotation by the screen image rotation unit 24 when the user s not touching the touch panel 14T is attributed to letter input.

Figure 10:
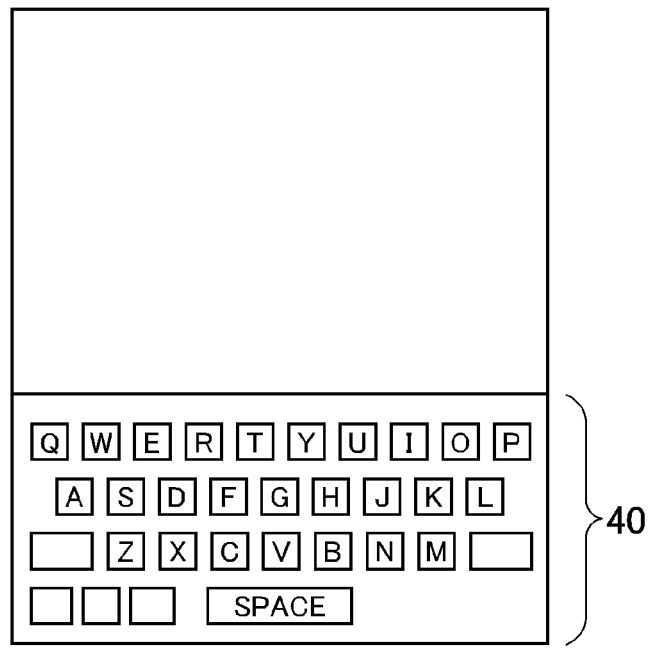
FIG. 10 is a diagram explaining another modified example of a terminal device.

FIG. 10 shows one example of a letter input screen image displayed on the display unit 17. On the letter input screen shown in FIG. 10, a so-called software keyboard 40 is displayed.

When a user stops touching the touch panel 14T on this letter input screen, letter input is executed based on the position the user was touching. Specifically, when a user touches a desired key with his finger and then releases the finger from the touch panel 14T, input of the letter corresponding to the key is executed.

For example, even in the case where there is, during the period from time T1 to time T2 (or Td), a moment at which a user is not touching the touch panel 14T (from time Ti to Tj), the suppression unit 30 may suppress screen image rotation by the screen image rotation unit 24 when the time difference between the moment and the time at which the letter input is executed is within a threshold.

According to this aspect, even in the case where a user releases his finger from the touch panel 14T, the automatic screen image rotation function is suppressed as long as the user s releasing the finger from the touch panel 14T is for the purpose of letter input. For example, when a user changes his position from sitting on a sofa to lying on the sofa while inputting a letter on the terminal device 10 (that is, the user changes his position from the one shown in FIG. 12 to the one shown in FIG. 16 while the user is inputting a letter), the automatic screen image rotation function is temporarily suppressed even if the user does not keep touching substantially the same position within the touch panel 14T.

[2] Note here that what is called a long press operation exists as one of the operations performed in the terminal device 10. A long press operation refers to an operation to keep pressing substantially the same position on the touch panel 14T for a predetermined period of time.

In the terminal device 10, it is determined that a long press operation has been performed when a state in which the amount of shift of the position touched by the user is within a predetermined amount continues for a predetermined period of time. Further, in the terminal device 10, predetermined processing for a long press operation is executed when a long press operation is performed.

As seen above, as the cases where a user keeps touching the touch panel 14T, there can be the case in which the user keeps touching the touch panel 14T in order to perform a long press operation as above, and the case in which the user keeps touching the touch panel 14T in order to suppress the automatic screen image rotation function.

Then, it may be arranged to separate the case in which a user keeps touching the touch panel 14T in order to perform a long press operation and the case in which a user keeps touching the touch panel 14T in order to suppress the automatic screen image rotation function.

Figure 11:
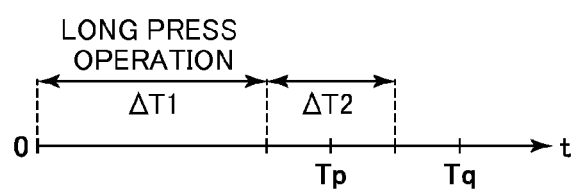
FIG. 11 is a diagram explaining another modified example of a terminal device.

FIG. 11 explains a separation from a long press operation. FIG. 11 shows that it is determined that a long press operation has been performed when a state in which the amount of shift of the position touched by a user is within a predetermined amount continues for a first predetermined period of time ($\Delta T1$) or longer.

In the case where a state in which the amount of shift of the position touched by a user is within the predetermined amount continues for a first predetermined period of time ($\Delta T1$) or longer, if the inclination state of the terminal device 10 becomes the state [d] (see FIG. 4) at a time (for example, Tp) after a continuation of the above described state for the first predetermined period of time ($\Delta T1$) but before an elapse of a second predetermined period of time ($\Delta T2$) subsequent thereto, the suppression unit 30 may determine that the user is continuously touching the touch panel 14T in order to temporarily suppress the screen image rotation function, and suppress screen image rotation by the screen image rotation unit 24.

Meanwhile, in the case where a state in which the amount of shift of the position touched by the user is within the predetermined amount continues for a first predetermined period of time ($\Delta T1$) or longer, if the inclination state of the terminal device 10 becomes the state [d] (see FIG. 4) at a time (for example, Tq) after an elapse of the second predetermined period of time ($\Delta T2$) subsequent to continuation of the above described state for the first predetermined period of time ($\Delta T1$), the suppression unit 30 may be configured to determine that the user has been touching the touch panel 14T for a long press operation, and not to suppress screen image rotation by the screen image rotation unit 24.

[3] Although two values (0 or 1) are set as the display orientation flag in the above described embodiment, four values (0 to 3), for example, may be set as the display orientation flag. In this case, for example, the value "0" corresponds to the state [a] shown in FIG. 4, the value "1" corresponds to the state [e] shown in FIG. 4, the value "2" corresponds to a state given by reversing the state [a] shown in FIG. 4 upside down, and the value "3" corresponds to a state given by reversing the state [e] shown in FIG. 4 left to right.

REFERENCE SIGNS LIST

10 terminal device, 11 control unit, 12 storage unit, 13 communication unit, 14 operation unit, 14B button, 14T touch panel, 15 image capturing unit, 16 posture detection sensor, 17 display unit, 18 sound output unit, 20 inclination detection unit, 22 display control unit, 24 screen image rotation unit, 26 touched position detection unit, 28 comparison unit, 30 suppression unit, 32 suppression continuation unit, 34 release unit, 40 software keyboard, U user, T terminal device.

The invention claimed is:

1. A terminal device having a display that displays a screen image, comprising:
   at least one processor;
   a touch panel;
   a posture detection sensor; and
   at least one storage device that stores a plurality of instructions, which when executed by the at least one processor, causes the at least one processor, the touch panel, and the posture detection sensor to operate to:
   detect an inclination of the terminal device;
   rotate the screen image when an inclination state of the terminal device becomes a predetermined state;
   detect a position touched by a user;
   compare a position touched by the user before the inclination state of the terminal device becomes the predetermined state and a position touched by the user when or after the inclination state of the terminal device becomes the predetermined state, and
   suppress rotation of the screen image, based on a result of comparison between the position touched by the user before the inclination state of the terminal device becomes the predetermined state and the position touched by the user when or after the inclination state of the terminal device becomes the predetermined state.

2. The terminal device according to claim 1, wherein the at least one processor is further caused to continue suppression of the rotation of the screen image even when the position touched by the user is no longer detected after the rotation of the screen image is suppressed.

3. The terminal device according to claim 2, wherein the at least one processor is further caused to release the suppression of the rotation of the screen image when a change of the inclination state of the terminal device becomes equal to or greater than a threshold in the case where the rotation of the screen image is continuously suppressed.

4. The terminal device according to claim 1, wherein
   the at least one processor determines whether or not an amount of shift between the position touched by the user before the inclination state of the terminal device becomes the predetermined state and the position touched by the user when or after the inclination state of the terminal device becomes the predetermined state is within a predetermined amount, and
   the at least one processor suppresses the rotation of the screen image when the amount of shift between the position touched by the user before the inclination state of the terminal device becomes the predetermined state and the position touched by the user when or after the inclination state of the terminal device becomes the predetermined state is within the predetermined amount.

5. The terminal device according to claim 1, wherein the at least one processor suppresses the rotation of the screen image when the position touched by the user is continuously detected during a period from a time before the inclination state of terminal device becomes the predetermined state to a time when or after the inclination state of the terminal device becomes the predetermined state, and an amount of shift of the position touched by the user during the period is within a predetermined amount.

6. The terminal device according to claim 5, wherein,
   the at least one processor is further caused to execute predetermined processing when a state where the amount of shift of the position touched by the user is within a first predetermined amount continues for a first predetermined period of time or longer,
   the at least one processor suppresses the rotation of the screen image when the state continues for the first predetermined period of time or longer, and the inclination state of the terminal device becomes the predetermined state before an elapse of a second predetermined time subsequent to a continuation of the state for the first predetermined period of time, and the at least one processor does not suppress the rotation of the screen image when the state continues for the first predetermined period of time or longer, and the inclination state of the terminal device becomes the predetermined state after the elapse of the second predetermined time subsequent to the continuation of the state for the first predetermined period of time.

7. The terminal device according to claim 5, wherein,
the at least one processor is further caused to execute letter input when the user stops touching the screen image, based on the position touched by the user, and the at least one processor suppresses the rotation of the screen image, even in a case where there is a moment at which the position touched by the user is not detected during the period, if a time difference between the moment and a moment at which the letter input is executed is within a threshold.

8. The terminal device according to claim 5, wherein the at least one processor suppresses the rotation of the screen image, even in a case where there is a moment at which the position touched by the user is not detected during the period, if a shift between a position touched by the user before the moment and a position touched by the user after the moment is within a threshold.

9. A control method for a terminal device having a display that displays a screen image, the control method comprising:
obtaining, with a posture detection sensor, a result of detecting an inclination of the terminal device;

rotating the screen image when an inclination state of the terminal device becomes a predetermined state;

obtaining, from a touch panel, a result of detecting a position touched by a user;

comparing, using at least one processor, a position touched by the user before the inclination state of the terminal device becomes the predetermined state and a position touched by the user when or after the inclination state of the terminal device becomes the predetermined state, and suppressing, using the at least one processor, a rotation of the screen image, based on a result of comparison at the comparing.

10. A non-transitory computer readable information storage medium storing a program for causing a terminal device, having a display that displays a screen image, to execute:
obtaining, with a posture detection sensor, a result of detecting an inclination of the terminal device;

rotating the screen image when an inclination state of the terminal device becomes a predetermined state;

obtaining, from a touch panel, a result of detecting a position touched by a user;

comparing a position touched by the user before the inclination state of the terminal device becomes the predetermined state and a position touched by the user when or after the inclination state of the terminal device becomes the predetermined state, and suppressing a rotation of the screen image, based on a result of comparison at the comparing.

* * * * *